(12) United States Patent
Kamino et al.

(10) Patent No.: US 7,740,434 B2
(45) Date of Patent: Jun. 22, 2010

(54) FASTENER

(75) Inventors: Yuichiro Kamino, Aichi-ken (JP); Kazuyuki Oguri, Aichi-ken (JP); Makoto Senda, Aichi-ken (JP); Takahiro Sekigawa, Aichi-ken (JP); Akiko Inoue, Aichi-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 691 days.

(21) Appl. No.: 11/529,244

(22) Filed: Sep. 29, 2006

(65) Prior Publication Data

US 2007/0081874 A1 Apr. 12, 2007

(30) Foreign Application Priority Data

Oct. 6, 2005 (JP) .............................. 2005-293866
Jun. 9, 2006 (JP) .............................. 2006-161274

(51) Int. Cl.
*F16B 37/14* (2006.01)
*B64D 45/02* (2006.01)

(52) U.S. Cl. ................. 411/372.5; 411/372.6; 244/1 A; 361/218

(58) Field of Classification Search ...... 411/372.5–377; 361/218; 244/1 A

See application file for complete search history.

(56) References Cited

U.S. PATENT DOCUMENTS

| | | | | |
|---|---|---|---|---|
| 4,502,092 A | * | 2/1985 | Bannink et al. | 361/218 |
| 4,628,402 A | * | 12/1986 | Covey | 361/218 |
| 4,630,168 A | | 12/1986 | Hunt | |
| 4,681,497 A | * | 7/1987 | Berecz | 411/377 |
| 4,789,918 A | * | 12/1988 | Bannink, Jr. | 361/218 |
| 4,884,929 A | * | 12/1989 | Smith et al. | 411/3 |
| 4,888,451 A | * | 12/1989 | Toni et al. | 174/94 R |
| 4,912,594 A | * | 3/1990 | Bannink et al. | 361/218 |
| 5,845,872 A | * | 12/1998 | Pridham et al. | 244/1 A |
| 5,997,229 A | * | 12/1999 | Akers | 411/373 |
| 6,327,132 B1 | * | 12/2001 | Andrivet et al. | 361/218 |
| 6,679,667 B2 | * | 1/2004 | Brown et al. | 411/377 |
| 7,050,286 B2 | * | 5/2006 | Pridham et al. | 361/218 |
| 7,277,266 B1 | * | 10/2007 | Le et al. | 361/218 |

* cited by examiner

*Primary Examiner*—Flemming Saether
(74) *Attorney, Agent, or Firm*—Wenderoth, Lind & Ponack, L.L.P.

(57) ABSTRACT

There is provided a fastener able to prevent damage due to environmental factors such as ultraviolet rays, and impact from sanddust, lumps of ice, and raindrops without obstructing a flow of electric shock current that flows along a top surface of an outer skin. The fastener connects an outer skin of an aircraft to a structural member positioned inside this outer skin, and is provided with a dielectric layer arranged to cover one end surface of a head section, and a conductive layer arranged to cover one end surface of this dielectric layer.

10 Claims, 4 Drawing Sheets

FASTENER

BACKGROUND OF THE INVENTION

1. Field of the Invention

The present invention relates to a fastener used where an electric conductive plastic material (for example, CFRP (carbon fiber reinforced plastic)) is used as an outer skin of an aircraft, and, in particular, to a lightning protection fastener.

2. Description of the Related Art

As a fastener used when an electric conductive plastic material is used as an outer skin of an aircraft, a fastener disclosed in the Specification of U.S. Pat. No. 4,630,168 is known, in which one end surface of a head section is covered by a dielectric cap.

In the fastener disclosed in the above Patent Document, the dielectric cap is positioned on the top surface of the aircraft, so that, in the case of guiding electric shock current of lightning along the top surface of the outer skin, there is a problem that the electric shock current needs to flow around this dielectric cap and the flow of electric shock current is obstructed.

Moreover, from the point of view of Lightning Protection Redundancy required by section 25.981(a)(3) of the FAR (Federal Aviation Regulation) of the United States of America, the abovementioned fastener is not appropriate because of a lack of sufficient countermeasures against deterioration of the dielectric cap due to environmental factors such as ultraviolet rays and damage due to impact from sanddust, lumps of ice and raindrops. Furthermore there is a risk of the dielectric caps peeling off (coming off) from the head section of the fastener during operation of the aircraft.

BRIEF SUMMARY OF THE INVENTION

In consideration of the above described problems, an object of the present invention is to provide a fastener able to prevent damage due to environmental factors such as ultraviolet rays, and impact from sanddust, without obstructing a flow of electric shock current that flows along a top surface of an outer plate.

Moreover, another object of the present invention is to provide a lightning protection fastener in which any possibility of peeling off during operation of an aircraft is eliminated.

In order to solve the above problems, the present invention employs the following means.

The fastener according to the present invention is a fastener that connects an outer skin of an aircraft to a structural member positioned inside this outer skin, wherein there are provided a dielectric layer arranged to cover one end surface of a head section, and a conductive layer arranged to cover one end surface of this dielectric layer.

According to the fastener of the present invention, since the section on the outside that is most likely to be exposed to impacts with solid bodies such as sanddust, lumps of ice, and raindrops during operation of the aircraft is covered by a conductive layer formed from a metal material (for example, copper, which is highly electrically conductive or stainless steel, which is highly corrosion protection), damage to the dielectric layer provided immediately inside the conductive layer due to ultraviolet rays, solid bodies and raindrops and so forth can be prevented.

Moreover, since the dielectric layer is arranged between the conductive layer and a fastener main body, even if lightning directly strikes the conductive layer, a flow of electric shock current towards the fastener main body can be completely obstructed and the electric shock current can be safely guided to the conductive layer.

It is preferable if the above conductive layer is a dielectric material having a dielectric breakdown voltage value of 100 kV/mm or greater, and it is more preferable if the above conductive layer is formed from any one of; a biaxial stretched polyethylene terephthalate (PET) film, a polyimide film, a biaxial stretched polyethylene naphthalate (PEN) film, a polyphenylene sulfide (PPS) film, or a biaxial stretched polypropylene film.

According to such a fastener, since the thickness of the dielectric layer can be significantly reduced, the weight of each fastener can be significantly reduced.

It is more preferable that in the fastener, the head section, the dielectric layer, and the conductive layer are connected to each other by a fixing means.

According to such a fastener, since the fastener is manufactured by stitching together the head section, the dielectric layer, and the conductive layer with a string-shaped member formed from polytetrafluoroethylene or Kevlar, and then putting them in an autoclave and curing them (hot forming), peeling off of the conductive layer from the dielectric layer, and peeling off of the dielectric layer from the head section can be reliably prevented while maintaining the fastener in an excellent condition at all times.

It is more preferable if in the fastener, the dielectric layer and the conductive layer are constructed as a double-layered structure, and the double-layered structure is fixed to the head section via an adhesive agent.

According to such fastener, since the double-layered structure having the dielectric layer and the conductive layer is fixed to the head section via an adhesive agent (for example, epoxy adhesive agent), the fastener can be manufactured easily and quickly, and a reduction in the manufacturing cost of the fastener can be achieved.

It is more preferable if in the fastener, the dielectric layer and the conductive layer are formed by means of a thermal spraying or a coating baking(curing) method.

According to such a fastener, since the dielectric layer and the conductive layer are respectively formed by means of a thermal spraying or a coating baking method, the fastener can be manufactured easily and quickly, and a reduction in the manufacturing cost of the fastener can be achieved.

An aircraft assembly part according to the present invention is an aircraft assembly part provided with; an outer skin-constructed with a conductive resin material as a main component, a structural member that supports this outer skin from the inside thereof, and a fastener that connects the outer skin to the structural member, and this fastener is the abovementioned fastener.

According to the aircraft assembly part according to the present invention, since a flow of electric shock current towards the fastener main body is completely obstructed by the dielectric layer, a flow of the electric shock current into the conductive resin material can be completely prevented, and damage to the conductive resin material due to the electric shock current can be completely prevented.

Furthermore, since an electric shock current does not flow towards the fastener main body, a DI (Dielectric Insulator) conventionally required between the structural member and a collar, and an insulating rubber cap conventionally attached to cover the whole of the top end section of the male screw section and the collar (attached to prevent a streamer that secondarily discharges electricity from the collar) can both be eliminated, and the weight of an aircraft can be significantly reduced.

Moreover, the term "resin material" here includes fiber reinforced resin materials such as CFRP (carbon fiber reinforced plastics).

It is more preferable in the aircraft assembly part if a conductive member is laminated on the outside surface of the conductive resin material, and the conductive layer and the conductive member are electrically connected.

According to such aircraft assembly part, even if lightning were to strike the conductive layer directly, the electric shock current could be smoothly guided towards the conductive member, and also electric current that has flowed to one side (for example, the left side in FIG. 2) of the conductive member can be smoothly guided through the conductive layer to the other side (for example, the right side in FIG. 2) of the conductive member.

The term "resin material" here includes fiber reinforced resin materials such as CFRP (carbon fiber reinforced plastics)

According to the fastener according to the present invention, an effect in that deterioration due to environmental factors such as ultraviolet rays and damage due to impacts with sanddust, lumps of ice, and raindrops can be prevented without obstructing the flow of electric shock current along the surface of the outer skin-can be achieved.

DETAILED DESCRIPTION OF THE INVENTION

Hereinafter, a first embodiment of a lightning protection fastener according to present invention is described, with reference to the drawings.

Figure 1A:
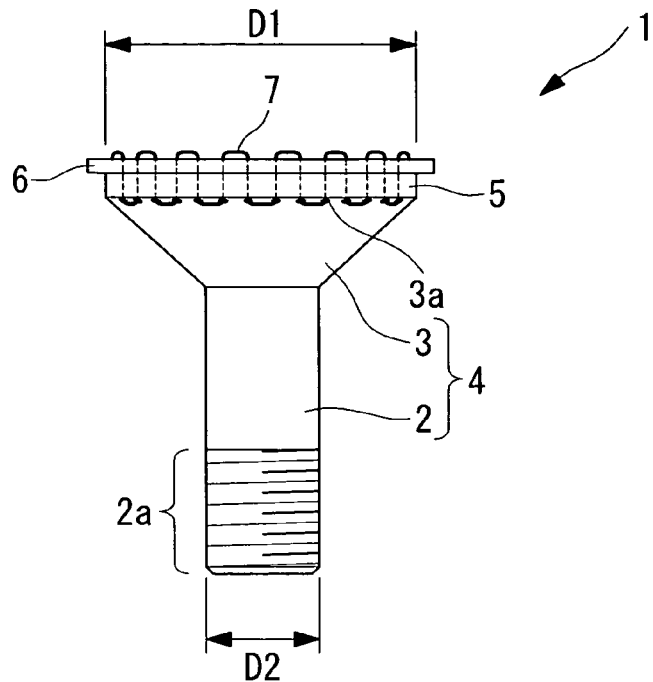
FIG. 1A, FIG. 1B, and FIG. 1C are diagrams that show a first embodiment of a fastener of the present invention, FIG. 1A being a front view, FIG. 1B being a perspective view from above, and FIG. 1C being a perspective view from below.
Figure 1B:
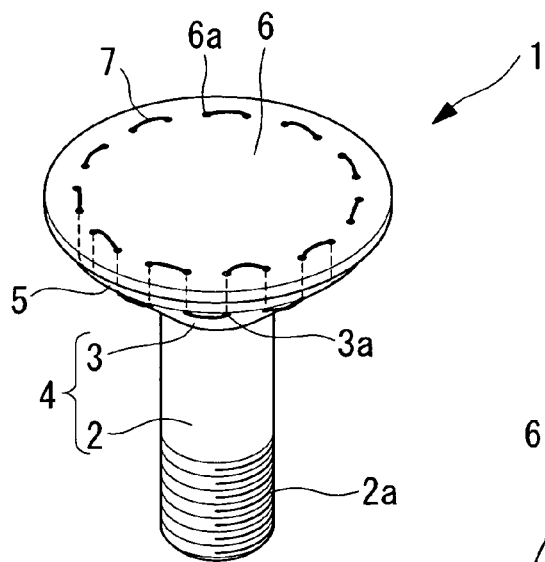
Figure 1C:
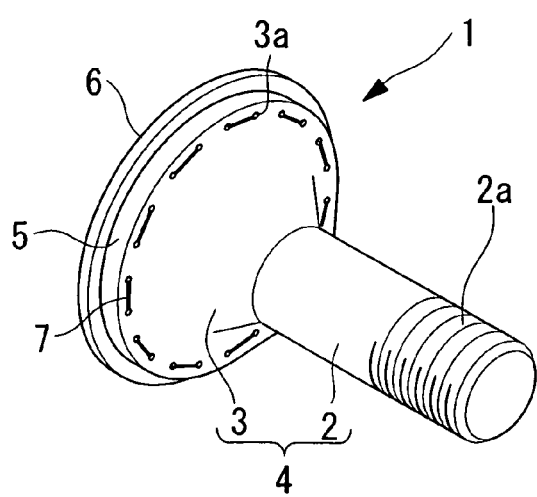

As shown in FIG. 1, the lightning protection fastener (hereinafter, referred to as the "fastener") 1 according to the present embodiment comprises as the main components: a fastener main body 4 having a column shaped shank section (Shank) 2 and a substantially conically shaped head section (Flush Head) 3 the diameter of which becomes greater in the direction away from the shank section 2; a dielectric layer 5 arranged to cover one end surface (upper side end surface in FIG. 1(a)) of the head section 3; a conductive layer 6 arranged to cover one end surface (upper side end surface in FIG. 1(a)) of the dielectric layer 5; and a fixing means 7.

The fastener main body 4 is formed from the integration of the shank section 2 and the head section 3, and is fabricated using alloy metals such as titanium (Ti-6Al-4V: annealed material) and inconel, for example.

A male screw section 2a that screws into and engages with a female screw section of a collar (nut) described later, is formed on the other end section (lower side end section in FIG. 1(a)) of the shank section 2.

The head section 3 is formed so that an outer diameter D1 thereof is greater than or equal to two times an outer diameter D2 of the shank section 2 for example, and a plurality of through holes 3a (22 holes in the present embodiment) that pass completely through in a plate thickness direction, are provided in a circumference section of the head section 3.

The dielectric layer 5 is a disc shaped member that is formed so that the diameter thereof is equal to (or substantially equal to) the outer diameter D1 of the head section 3, and it is fabricated using GFRP (glass-fiber reinforced resin) for example. In the circumference section of the dielectric layer 5, a plurality of through holes (22 holes in the present embodiment) (not shown in the diagram) passing through in the plate thickness direction, are provided at positions that correspond to the through holes 3a provided in the circumference section of the head section 3. With a thickness of, for example, 1.0 mm, the dielectric layer 5 is constructed to have sufficient dielectric strength, even against a lightning strike test voltage of MIL-STD-1757A Zone 1 (approximately 40 kV). In the case where GFRP is used as the dielectric layer 5, since even a conservative estimate of the dielectric strength of GFRP is 40 kV/mm, the dielectric layer has sufficient dielectric strength even if it is subjected to a lightning strike test voltage (approximately 40 kV) of MIL-STD-1757A Zone 1 at a thickness of 1.0 mm.

The conductive layer 6 is a disc shaped member formed so that the outer diameter thereof is greater than the outer diameter D1 of the head section 3 (for example, greater by 1.0 mm), and the thickness thereof is less than that of the dielectric layer 5 (or substantially equal to the thickness of the dielectric layer 5). The conductive layer 6 is fabricated using metal materials having a strong spring force (that is, metal materials that do not plastically deform easily) such as CRES (Corrosion Resistant Stainless Steel) and beryllium copper. In the circumference section of the conductive layer 6, a plurality of through holes (22 holes in the present embodiment) passing through in the plate thickness direction are provided at positions that correspond to the through holes provided in the circumference section of the dielectric layer 5.

The fixing means 7 is a string shaped member formed for example from polytetrafluoroethylene or Kevlar, and as shown in FIG. 1, it is inserted through the through holes 3a of the head section 3, the through holes of the dielectric layer 5, and the through holes 6a of the conductive layer 6 to stitch the head section 3, the dielectric layer 5, and the conductive layer 6 together, and thereby secure (fasten) the head section 3, the dielectric layer 5, and the conductive layer 6 to each another.

The fastener 1 described above is manufactured by the following steps.

(1) The fastener main body 4 formed with the male screw section 2a on the other end section of the shank section 2, and formed with the plurality of the through holes 3a in the circumference section of the head section 3, the dielectric layer 5 in a state prior to curing (in a pre-impregnation state), and the conductive layer 6 formed with a plurality of through holes in the circumference section, are prepared.

(2) The dielectric layer 5 is placed on one end surface of the head section 3, and the conductive layer 6 is further placed on one end surface of this dielectric layer 5, so that the positions of the through holes 6a are aligned with the positions of the through holes 3a.

(3) The fixing means 7 is passed through the through holes 3a of the head section 3, the through holes of the dielectric layer 5, and the through holes 6a of the conductive layer 6 to stitch them together so that the head section 3, the dielectric layer 5, and the conductive layer 6 will not separate from one another.

(4) The fastener 1 is placed in an autoclave for curing (hot forming).

Figure 2:
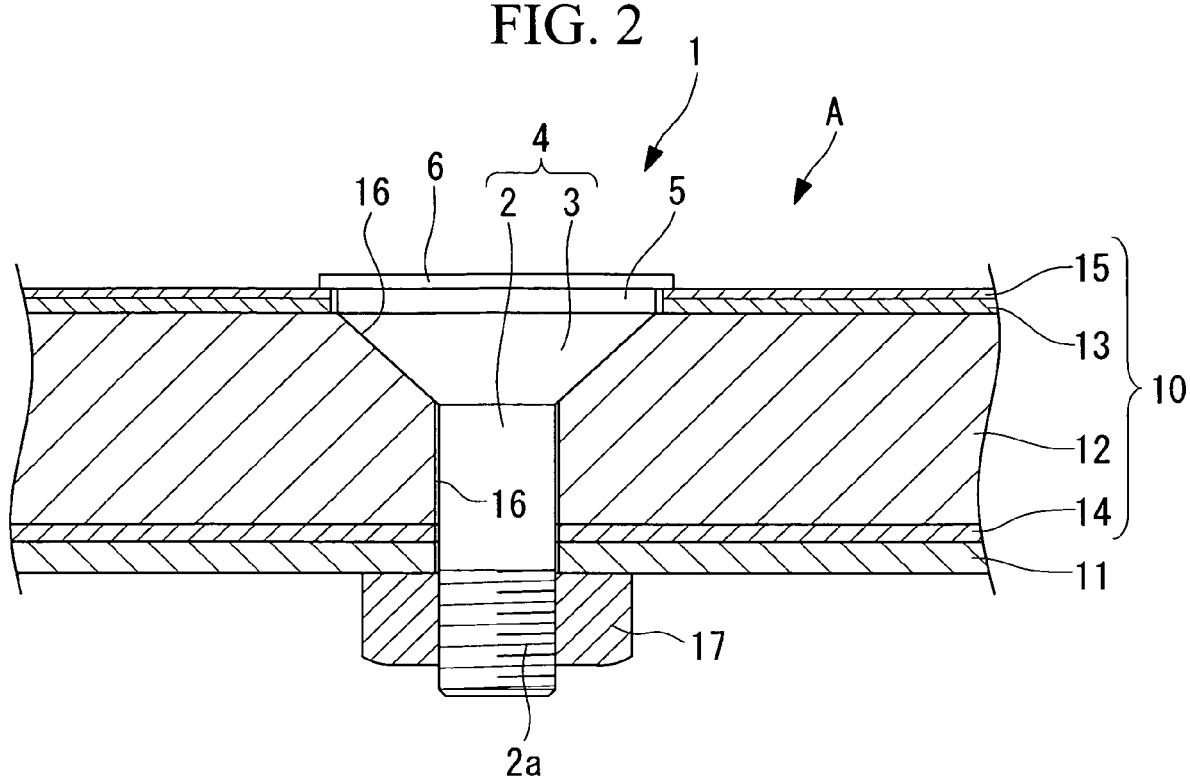
FIG. 2 is a vertical sectional view of an aircraft assembly part showing an outer skin and a structural member in a state of being connected by the fastener shown in FIG. 1.

The fastener 1 manufactured as described above is used for connecting an outer skin 10 of an aircraft shown in FIG. 2 (the fixing means 7 is not shown in the diagram) to a structural member 11 (for example, a rib or a stringer), for example. Moreover, the outer skin 10 and the structural member 11 are connected by the fastener 1 to become an aircraft assembly part A (for example, a main wing assembly, a tail assembly, or a body assembly).

The outer skin 10 is formed mainly from a conductive ($1/100$ to $1/1000$ of the electric conductivity of aluminum) plastic material 12 (for example, CFRP (carbon fiber reinforced plastics), hereinafter referred to as "CFRP"), and an insulative resin materials 13 and 14 (for example, GFRP (glass fiber reinforced plastics), hereinafter referred to as "GFRP") are laminated on an entire top surface (the surface positioned on the outside after assembly) and an entire back surface (the surface positioned on the inside after assembly) thereof.

Furthermore, on the top surface (the surface positioned on the outside after assembly) of the GFRP 13 positioned on the top surface side of the CFRP 12, a mesh shaped (or sheet shaped) member (for example, of copper, hereinafter referred to as "conductive mesh") 15, the whole of which has electric conductivity, is laminated.

The structural member 11 is formed, for example, from aluminum alloy metal, titanium material, or CFRP (carbon fiber reinforced plastics), and is arranged in a predetermined position on the back surface (the surface positioned on the inside after assembly) of the GFRP 14.

Concavities (holes) 16 that pass completely through these outer skin 10 and structural member 11 in the plate thickness direction, and that can receive the fasteners 1, are provided in predetermined positions in the structural object in which the structural member 11 is arranged on the back surface of the GFRP 14. The fasteners 1 are accommodated in each of the concavities 16, and collars (nuts) 17 fabricated using alloyed metals such as titanium and inconel, are fastened to the male screw sections 2a projecting inward from the back surface of the structural member 11. Moreover, in a state with the collar 17 fastened to the male screw section 2a, the back surface positioned on the circumference section of the conductive layer 6 comes into contact with the top surface of the conductive mesh 15.

In FIG. 2, the conductive layer 6 projects as much as the plate thickness thereof outward from the top surface of the conductive mesh 15. However, the plate thickness of the conductive layer 6 is less than several 0.1 mms, and the top surface of the outer skin 10 after painting becomes substantially even since the top surfaces of the conductive layer 6 and conductive mesh 15 are eventually subjected to painting.

According to the fastener 1 of the present embodiment, since the outermost place, which is highly likely to receive ultraviolet rays and the impact of sanddust, lumps of ice, raindrops, and so forth during the operation of an aircraft, is covered by the conductive layer 6 formed for example from metal materials such as copper, stainless steel, and the like, damage due to ultraviolet rays, solid bodies and the like to the dielectric layer 5 provided immediately inside the conductive layer 6 can be prevented.

Moreover, since the dielectric layer 5 is arranged between the conductive layer 6 and the fastener main body 4, even if lightning were to strike the conductive layer 6 directly, a flow of electric shock current towards the fastener main body 4 can be completely obstructed.

Furthermore, since the fastener 1 is manufactured by curing (hot forming) in an autoclave after the head section 3, the dielectric layer 5, and the conductive layer 6 have been stitched together by the fixing means 7, peeling off of the conductive layer 6 from the dielectric layer 5 and peeling off of the dielectric layer 5 from the head section can be reliably prevented while maintaining the fastener 1 in an excellent condition at all times.

Moreover, in the case where the fastener 1 according to the present embodiment is used for connecting the outer skin 10 to a structural member 11 (for example, a rib or a stringer) of an aircraft as shown in FIG. 2, since the back surface positioned on the circumference section of the conductive layer 6 comes into contact with the surface of the conductive mesh 15, even if lightning were to strike the conductive layer 6, a flow of electric shock current could be smoothly guided towards the conductive mesh 15. Furthermore, electric shock current that has flowed from one side (for example, the left side in FIG. 2) of the conductive mesh 15 can be smoothly guided to the other side (for example, the right side in FIG. 2) of the conductive mesh 15 through the conductive layer 6.

Moreover, since the flow of electric shock current towards the fastener main body 4 is completely obstructed by the dielectric layer 5, a flow of electric shock current into the CFRP 12 can be completely prevented, and damage to the CFRP 12 due to the electric shock current can be completely prevented.

Furthermore, according to the fastener 1 of the present embodiment, since electric shock current does not flow towards the fastener main body 4, a DI (Dielectric Insulator) conventionally required between the structural member 11 and the collar 17 for preventing sparks, and an insulating rubber cap conventionally attached to cover the whole of the top end section of the male screw section 2a and the collar 17 (attached to prevent a streamer that secondarily discharges electricity from the collar 17) can both be eliminated, and the weight of an aircraft can be significantly reduced.

Figure 3:
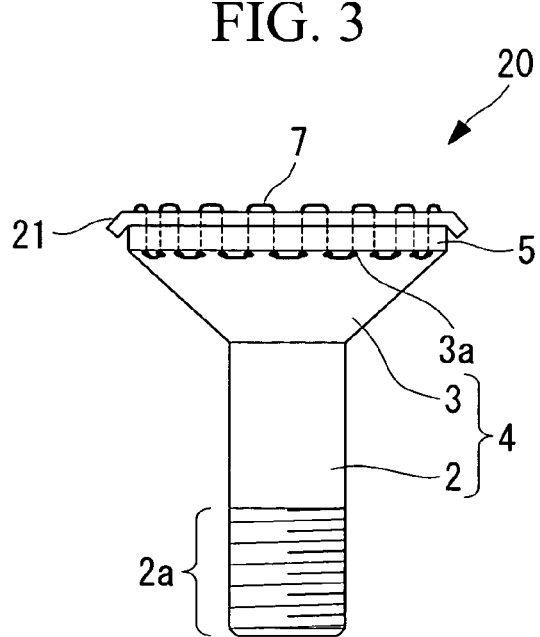
FIG. 3 is a front view showing a second embodiment of the fastener of the present invention.

A second embodiment according to the present invention is described, using FIG. 3.

A fastener 20 in the present embodiment differs from the above described embodiment in that a conductive layer 21 is provided instead of the conductive layer 6 described above, in which a circumference section positioned to the outside of the through holes 6a in a radial direction is bent towards (made to face) the fastener main body 4 side (downside in FIG. 3). Other components are identical with those in the first embodiment described above, and descriptions for these identical components are omitted here.

Moreover, the same reference symbols are given to members that are identical with those in the first embodiment.

According to the fastener 20 of the present embodiment, in the case where it is used for connecting the outer skin 10 to a structural member 11 (for example, a rib or a stringer) of an aircraft as shown in FIG. 2 for example, since a back surface positioned on the circumference section of the conductive layer 21 can come into close contact with the top surface of the conductive mesh 15, and the contact between the back surface positioned on the circumference section of the conductive layer 21 and the conductive mesh 15 can be made more reliable, even if lightning were to strike the conductive layer 6 directly, a flow of electric shock current could be smoothly guided towards the conductive mesh 15, and also electric shock current that has flowed from one side (for example, the left side in FIG. 2) of the conductive mesh 15, can be more smoothly guided to the other side (for example, the right side in FIG. 2) of the conductive mesh 15 through the conductive layer 6.

Other effects are same as those in the first embodiment described above, and their descriptions are omitted here.

Figure 4:
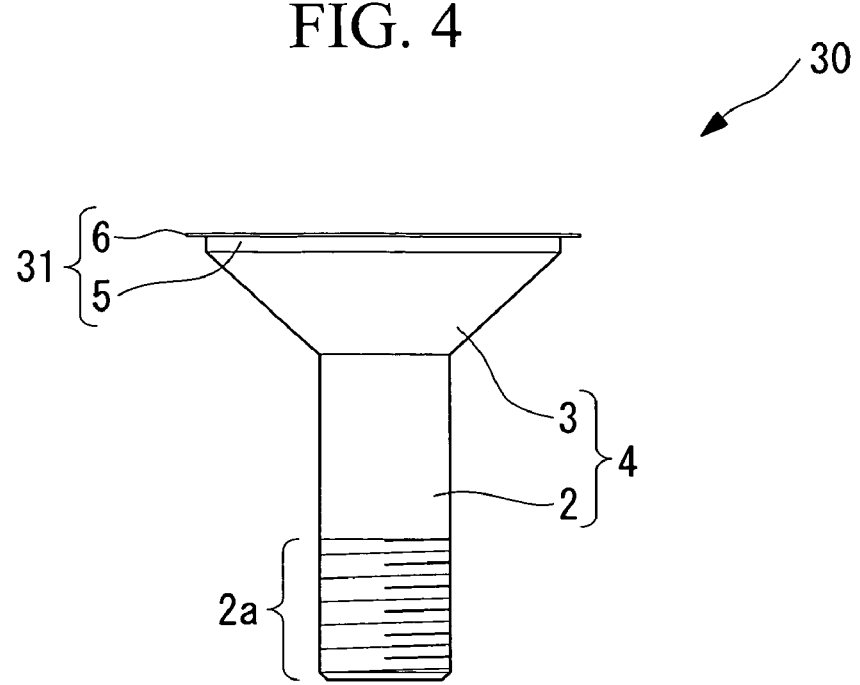
FIG. 4 is a front view showing a third embodiment of the fastener of the present invention.

A third embodiment according to the present invention is described, using FIG. 4.

A fastener 30 in the present embodiment differs from the first embodiment in that a double layer structure 31 in which a conductive layer 6 is laminated on the top surface of a dielectric layer 5, is fixed on (attached to) the head section 3 of the fastener main body 4 via an adhesive agent (not shown in the diagram). Other components are identical with those in the first embodiment described above, and descriptions for these identical components are omitted here.

Moreover, the same reference symbols are given to members that are identical with those in the first embodiment.

In the present embodiment, GFRP having a thickness of 1.0 mm is used as the dielectric layer 5, and copper foil having a thickness of 0.2 mm (a thickness of 30 μm may even be used) is used as the conductive layer 6.

Moreover, epoxy adhesive agent (for example, the epoxy adhesive agent EA9396 made by the company Hysol-Dexter) is used as the adhesive agent.

The fastener 30 described above is manufactured in following steps.

(1) After the conductive layer 6 has been laminated on (placed on) the surface (top) of the dielectric layer 5 prior to curing (in a pre-impregnation state) and these have been impregnated with epoxy resin, these layers are subjected to heat curing to manufacture the double layer structure 31.

(2) The fastener main body 4 formed with the male screw section 2a on the other end of the shank section 2 is prepared, particles (for example, hard particles such as metal, ceramic or glass of average particle diameter 200 μm or less(more preferably, average particle diameter between 10 μm and 100 μm)) are shot blasted on one end surface (top surface) of the head section 3 to carry out a pre-processing for roughening the top surface of the head section 3.

Sand paper and so forth may also be used instead of shot blasting to roughen the top surface of the head section 3.

(3) Water break free processing (a method for applying sanding until the surface stops repelling) by sanding is carried out on the exposed surface of the dielectric layer 5 of the two layer structure 31.

(4) After adhesive agent is applied on the one end surface of the head section 3, the two layer structure 31 is placed thereon, and by hardening the adhesive agent, the two layer structure is fixed onto the head section 3.

According to the fastener 30 of the present embodiment, since the outermost place, which is highly likely to receive ultraviolet rays and the impact of sanddust, lumps of ice, raindrops, and so forth during the operation of an aircraft, is covered by the conductive layer 6 formed for example from a metal material such as copper, stainless steel, and the like, damage due to ultraviolet rays, solid bodies and the like to the dielectric layer 5 provided immediately inside the conductive layer 6 can be prevented.

Moreover, since the dielectric layer 5 is arranged between the conductive layer 6 and the fastener main body 4, even if lightning were to strike the conductive layer 6 directly, a flow of electric shock current towards the fastener main body 4 can be completely obstructed.

Furthermore, since the double layer structure 31 provided with the dielectric layer 5 and the conductive layer 6 is fixed onto the head section 3 via an adhesive agent, easier and quicker production of the fastener 30 can be achieved, and a greater reduction in production cost can be achieved compared to the fastener of the first embodiment described above.

Moreover, since pre-processing for surface-roughening has been applied to the top surface of the head section 3, the double layer structure 31 can be reliably fixed (firmly) onto the head section 3, and peeling off of the double layer structure 31 from the head section 3 can be reliably prevented during aircraft operation, while maintaining the fastener 30 in an excellent condition at all times.

Furthermore, in the case where the fastener 30 according to the present embodiment is used for connecting the outer skin 10 to a structural member 11 (for example, a rib or a stringer) of an aircraft as shown in FIG. 2, since the back surface positioned on the circumference section of the conductive layer 6 comes into contact with the surface of the conductive mesh 15, even if lightning were to strike the conductive layer 6, a flow of electric shock current could be smoothly guided towards the conductive mesh 15, and furthermore, electric shock current that has flowed from one side (for example, the left side in FIG. 2) of the conductive mesh 15 can be smoothly guided to the other side (for example, the right side in FIG. 2) of the conductive mesh 15 through the conductive layer 6.

Moreover, since the flow of electric shock current towards the fastener main body 4 is completely obstructed by the dielectric layer 5, a flow of electric shock current into the CFRP 12 can be completely prevented, and damage to the CFRP 12 due to the electric shock current can be completely prevented.

Furthermore, according to the fastener 30 of the present embodiment, since electric shock current does not flow towards the fastener main body 4, a DI (Dielectric Insulator) conventionally required between the structural member 11 and the collar 17 for preventing sparks, and an insulating rubber cap conventionally attached to cover the whole of the top end section of the male screw section 2a and the collar 17 (attached to prevent a streamer that secondarily discharges electricity from the collar 17) can both be eliminated, and the weight of an aircraft can be significantly reduced.

Figure 5:
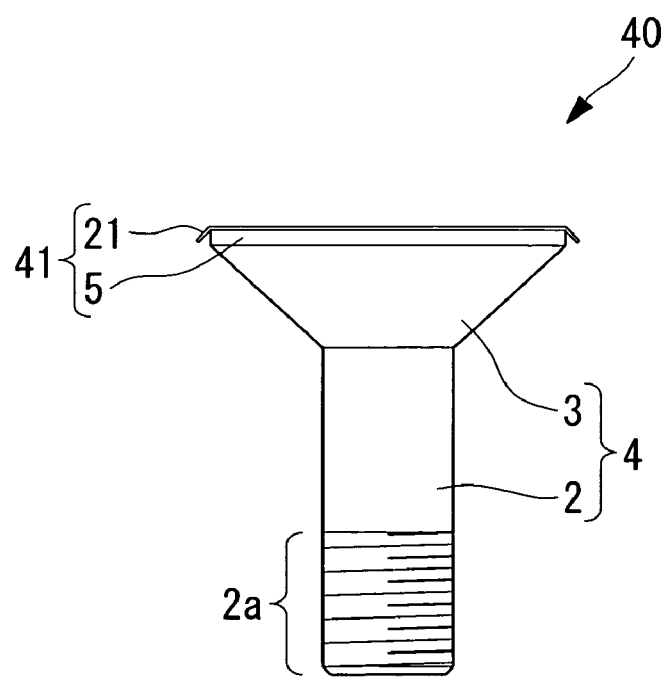
FIG. 5 is a front view showing a fourth embodiment of the fastener of the present invention.

A fourth embodiment according to the present invention is described, using to FIG. 5.

A fastener 40 in the present embodiment differs from the above described third embodiment in that a conductive layer 21 is provided instead of the conductive layer 6 described above, in which a circumference section positioned to the outside of the through holes 6a in a radial direction is bent towards (made to face) the fastener main body 4 side (downside in FIG. 5). Other components are identical with those in the third embodiment described above, and descriptions for these identical components are omitted here.

Moreover, the same reference symbols are given to members that are identical with those in the third embodiment.

According to the fastener 40 of the present embodiment, in the case where it is used for connecting the outer skin 10 to a structural member 11 (for example, a rib or a stringer) of an aircraft as shown in FIG. 2 for example, since a back surface positioned on the circumference section of the conductive layer 21 can come into close contact with the top surface of the conductive mesh 15 and the contact between the back surface positioned on the circumference section of the conductive layer 21 and the conductive mesh 15 can be made more reliable, even if lightning were to strike the conductive layer 6 directly, a flow of electric shock current could be more smoothly guided towards the conductive mesh 15, and also electric shock current that has flowed from one side (for example, the left side in FIG. 2) of the conductive mesh 15 can be more smoothly guided to the other side (for example, the right side in FIG. 2) of the conductive mesh 15 through the conductive layer 6.

Other effects are same as those in the third embodiment described above, and their descriptions are omitted here.

Moreover, the present invention is not limited to the embodiments described above, and instead of the double layer structure 31, a double layer structure that uses PET (for example, Luminar manufactured by Toray Industries, Inc.) of thickness 120 μm as the dielectric layer 5, and copper foil of thickness 30 μm as the conductive layer 6 may be used.

By using PET as the dielectric layer 5 as described, the thickness of the dielectric layer 5 can be significantly reduced, and the weight of each fastener can be significantly reduced.

A dielectric breakdown voltage of GFRP is approximately 40 kV/mm, whereas a dielectric breakdown voltage of PET (biaxial stretched polyethylene terephthalate) is approximately 300 kV/mm.

Furthermore, in the case of using Luminar manufactured by Toray Industries, Inc. as the dielectric layer 5, the thickness thereof is preferably any one of 100 μm, 125 μm, 188 μm, 210 μm, or 250 μm.

Moreover, instead of the double layer structure 31, a double layer structure that uses polyimide (kapton) of thickness 125 μm as the dielectric layer 5, and copper foil of thickness 30 μm as the conductive layer 6 may be used.

By using polyimide as the dielectric layer 5 as described, the thickness of the dielectric layer 5 can be significantly reduced, and the weight of each fastener can be significantly reduced.

A dielectric breakdown voltage of GFRP is approximately 40 kV/mm, whereas a dielectric breakdown voltage of polyimide is approximately 300 kV/mm.

Moreover, in the case where polyimide is used as the dielectric layer 5 in this way, the double layer structure may be fixed on the head section by means of heat bonding using the polyimide layer instead of using the epoxy adhesive agent (for example, epoxy adhesive agent EA9396 manufactured by the company Hysol-Dexter) described above.

Furthermore, instead of the double layer structure 31, a double layer structure that uses biaxial stretched polyethylene naphthalate (PEN) (for example, Teonex manufactured by Tejin, Inc.) of thickness 125 μm as the dielectric layer 5, and copper foil of thickness 30 μm as the conductive layer 6 may be used.

By using PEN as the dielectric layer 5 as described, the thickness of the dielectric layer 5 can be significantly reduced, and the weight of each fastener can be significantly reduced.

A dielectric breakdown voltage of GFRP is approximately 40 kV/mm, whereas a dielectric breakdown voltage of PEN (biaxial stretched polyethylene terephthalate film) is 300 kV/mm to 400 kV/mm.

Moreover, in the case where Teonex manufactured by Teijin, Inc. is used as the dielectric layer 5, the thickness thereof is preferably any one of 75 μm, 100 μm, 188 μm, or 250 μm.

Furthermore, the dielectric layer 5 and the conductive layer 6 may be formed on the top surface of the head section 3 by means of thermal spraying (for example, plasma spraying, electric arc spraying, HVOF spraying or the like) instead of adhering (hot bonding) the double layer structure onto the top surface of the head section 3.

Specifically, an alumina dielectric layer is sprayed on the top surface of the head section 3 and a copper conductive layer is sprayed thereon.

The dielectric layer 5 is not limited to alumina. Moreover a sealing process may be carried out by means of impregnation with a silicone or polyimide solution to improve its dielectric property, since the dielectric property of thermal spraying coating is degraded by the presence of voids in the coating.

Furthermore, the dielectric layer 5 and the conductive layer 6 may be formed on the top surface of the head section 3 by means of a coating baking method instead of adhering (hot bonding) the double layer structure on the top surface of the head section 3.

Specifically, polyimide is coated on the head section 3 by carrying out coating, drying and baking, using polyimide varnish (solution), for example, Polyimide Varnish (U-Varnish) manufactured by Ube Industries, Inc. In order to increase the thickness of the polyimide layer, the steps of coating, drying, and baking may be carried out repeatedly.

Subsequently, silver paste is coated on the top surface of the polyimide layer to form the conductive layer.

Figure 6:
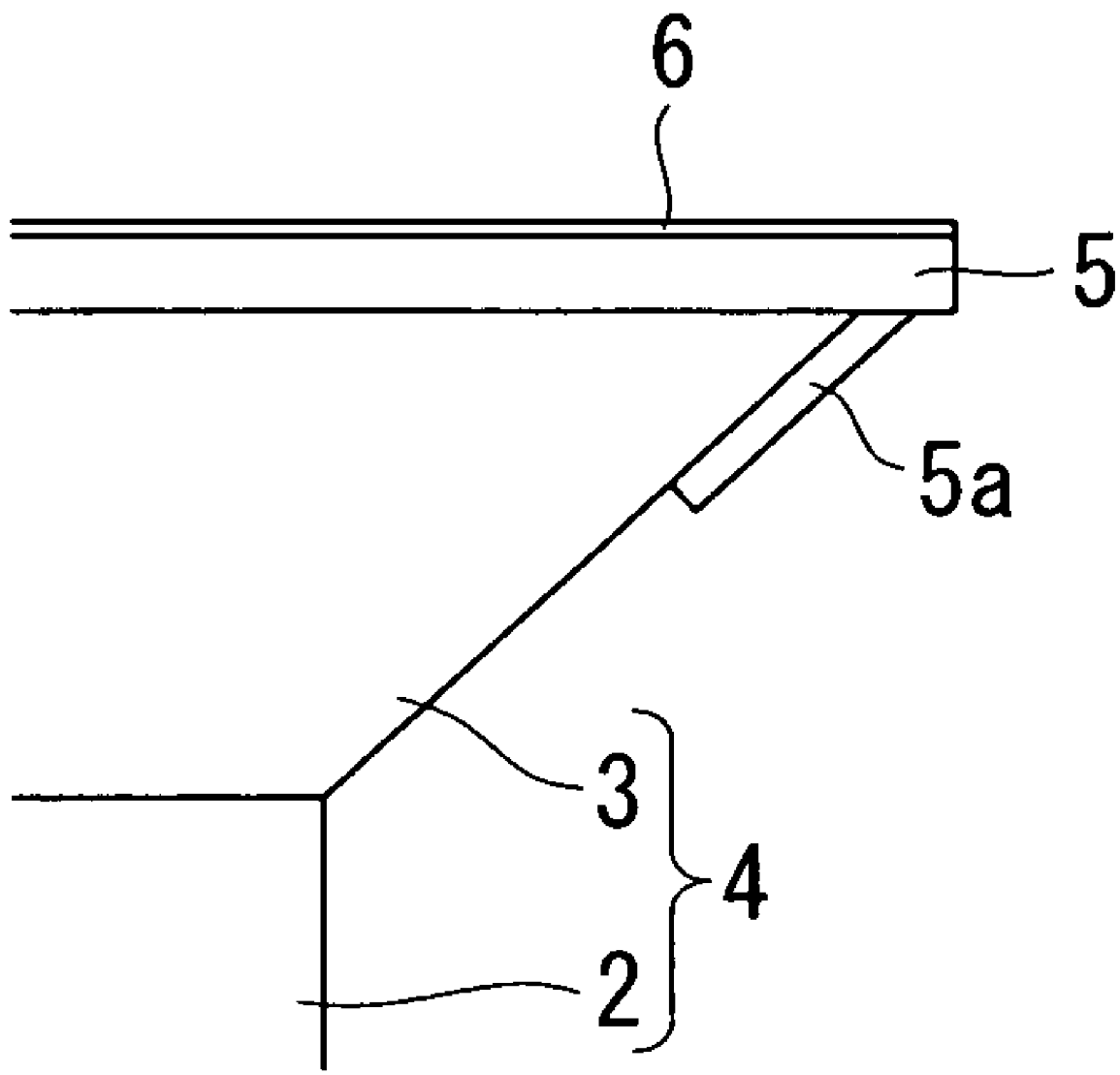
FIG. 6 is an enlarged sectional view of a main part, illustrating another embodiment of the fastener of the present invention.

Furthermore, it is even more preferable if the outer diameter of the dielectric layer 5 is equal to (or substantially equal to) the outer diameter of the conductive layer 6 as shown in FIG. 6, that is, if the outer diameter of the dielectric layer 5 is greater than the outer diameter D1 of the head section 3 (for example, greater by 1.0 mm).

Accordingly, since the flow of electric shock current towards the fastener main body 4 is completely obstructed by the dielectric layer 5, a flow of electric shock current into the CFRP 12 can be completely prevented, and damage to the CFRP 12 due to the electric shock current can be completely prevented.

Furthermore, it is more preferable if a second dielectric layer 5a is provided around the circumferential direction on the circumference section positioned on the outside in the radial direction of the head section 3 as shown in FIG. 6.

Accordingly, inflow of electric current due to secondary discharge of lightening can be prevented.

Furthermore, the shank section 2 may be wet-installed, using an electrically conductive compound. As a result, the contact between the shank section 2 and the CFRP 12 can be made more reliable, and an electric potential of the fastener when electric shock current is loaded (when struck by lightening) can be fixed lower.

What is claimed is:

1. A fastener for connecting an outer skin of an aircraft to a structural member positioned inside the outer skin, comprising:
    a head section;
    a dielectric layer arranged such that a first end surface of the dielectric layer covers an end surface of said head section, said end surface of said head section and said first end surface of said dielectric layer having a substantially same shape;
    a conductive layer arranged to cover a second end surface of said dielectric layer; and
    wherein an outer diameter of said dielectric layer is substantially equal to an outer diameter of said end surface of said head section.

2. A fastener according to claim 1, wherein said dielectric layer is a dielectric material having a dielectric breakdown voltage value of 100 kV/mm or greater.

3. A fastener according to claim 2, wherein said dielectric layer is formed from any one of a biaxial stretched polyethylene terephthalate film, a polyimide film, a biaxial stretched polyethylene naphthalate film, a polyphenylene sulfide film, or a biaxial stretched polypropylene film.

4. A fastener according to claim 1, wherein said head section, said dielectric layer, and said conductive layer are connected to each other by a fixing member.

5. A fastener according to claim 1, wherein said dielectric layer and said conductive layer are constructed as a double-layered structure, and said double-layered structure is fixed to said head section via an adhesive agent.

6. A fastener according to claim 1, wherein said dielectric layer and said conductive layer are formed by means of a thermal spraying or a coating baking method.

7. A fastener according to claim 1, wherein said dielectric layer has a disc shape, and wherein an outer diameter of said conductive layer is greater than an outer diameter of said end surface of said head section.

8. An aircraft assembly part comprising:
an outer skin constructed with a conductive plastic material as a main component;
a structural member that supports said outer skin from an inside thereof; and
a fastener that connects said outer skin to said structural member, wherein said fastener comprises
a head section
a dielectric layer arranged such that a first end surface of the dielectric layer covers an end surface of said head section, said end surface of said head section and said first end surface of said dielectric layer having a substantially same shape;
a conductive layer arranged to cover a second end surface of said dielectric layer; and
wherein an outer diameter of said dielectric layer is substantially equal to an outer diameter of said end surface of said head section.

9. An aircraft assembly part according to claim 7, further comprising a conductive member laminated on an outside surface of said conductive plastic material, said conductive layer and said conductive member being electrically connected.

10. An aircraft assembly part comprising:
an outer skin constructed with a conductive plastic material as a main component;
a structural member that supports said outer skin from an inside thereof; and
a fastener that connects said outer skin to said structural member, wherein said fastener comprises,
a head section;
a dielectric layer arranged such that a first end surface of the dielectric layer covers an end surface of said head section, said end surface of said head section and said first end surface of said dielectric layer having a substantially same shape;
a conductive layer arranged to cover a second end surface of said dielectric layer;
wherein said dielectric layer has a disc shape, and an outer diameter of said conductive layer is greater than an outer diameter of said end surface of said head section; and
wherein an outer diameter of said dielectric layer is substantially equal to the outer diameter of said end surface of said head section,
and wherein a back surface of a circumferential portion of said conductive layer is in contact with a surface of said outer skin.

* * * * *